US007675725B2

(12) United States Patent
Matsuda

(10) Patent No.: US 7,675,725 B2
(45) Date of Patent: Mar. 9, 2010

(54) CONSTANT VOLTAGE OUTPUT CIRCUIT

(75) Inventor: Hideo Matsuda, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 291 days.

(21) Appl. No.: 11/934,598

(22) Filed: Nov. 2, 2007

(65) Prior Publication Data

US 2008/0112103 A1 May 15, 2008

(30) Foreign Application Priority Data

Nov. 13, 2006 (JP) ............................ 2006-306966

(51) Int. Cl.
*H02H 3/20* (2006.01)

(52) U.S. Cl. ............................. 361/90; 361/18; 361/79

(58) Field of Classification Search .................. 361/18, 361/79, 90
See application file for complete search history.

(56) References Cited

U.S. PATENT DOCUMENTS 3,512,044 A * 5/1970 Jones .......................... 361/55
5,570,004 A 10/1996 Shibata
5,859,757 A * 1/1999 Hanafusa et al. ............ 361/100
6,201,674 B1 * 3/2001 Warita et al. .................. 361/18
7,092,226 B2 * 8/2006 Haraguchi et al. ............ 361/18

FOREIGN PATENT DOCUMENTS

JP 2-235119 A 9/1990
JP 2001-216037 8/2001
JP 2005-293067 10/2005

* cited by examiner

*Primary Examiner*—Stephen W Jackson
*Assistant Examiner*—Terrence R Willoughby
(74) *Attorney, Agent, or Firm*—Nixon & Vanderhye, P.C.

(57) ABSTRACT

A constant voltage output circuit has an output power transistor supplied with electric power form a first input power source and a control circuit supplied with electric power from a second input power source. Here, when the voltage from the first input power source is equal to or higher than a predetermined level Va, an overcurrent protection circuit and a short-circuiting protection circuit operate. Furthermore, yet another protection circuit is provided that operates even when the voltage from the first input power source is lower than the predetermined level Va.

9 Claims, 8 Drawing Sheets

CONSTANT VOLTAGE OUTPUT CIRCUIT

This nonprovisional application claims priority under 35 U.S.C. § 119(a) on Patent Application No. 2006-306966 filed in Japan on Nov. 13, 2006 the entire contents of which are hereby incorporated by reference.

BACKGROUND OF THE INVENTION

1. Field of the Invention

The present invention relates to a constant voltage output circuit, and more particularly to a constant voltage output circuit that is supplied with electric power from a plurality of power sources.

2. Description of Related Art

Conventionally, constant voltage output circuits are provided with an overcurrent protection circuit and a short-circuiting protection circuit so that, even if their output power transistor happens to output excessive electric power above its rated operating level, the load connected to them is not destroyed. Examples of constant voltage output circuits provided with a protection circuit are proposed, for example, in JP-A-2005-293067 (hereinafter Patent Document 1), pp. 4-5 and FIG. 1 and in JP-A-2001-216037 (hereinafter Patent Document 2), pp. 5-7 and FIG. 1. The power regulator of Patent Document 2 is provided with two input power sources so that its output power transistor and control circuit are supplied with electric power from different input power sources.

FIG. 8 is a block diagram of a conventional constant voltage output circuit provided with an overcurrent protection circuit and a short-circuiting protection circuit. The constant voltage output circuit 10 shown in FIG. 8 is provided with an input power source VCC2, an input power source VCC1, a control circuit 20 including an operational amplifier, an output power transistor 12, an output terminal Vo, an overcurrent protection circuit 15 and a short-circuiting protection circuit 16. The constant voltage output circuit 10 supplies a voltage to a load (unillustrated) connected to the output terminal Vo.

In the constant voltage output circuit 10, the control circuit 20 is supplied with electric power from the input power source VCC2. The output power transistor 12 is an NPN-type bipolar transistor. The output power transistor 12 receives at its collector the output voltage of the input power source VCC1, and is at its emitter grounded via a serial circuit composed of voltage division resistors 13 and 14. The emitter of the output power transistor 12 is also connected to the output terminal Vo.

The node between the voltage division resistors 13 and 14 is connected to the inverting input terminal (−) of the operational amplifier of the control circuit 20. The operational amplifier of the control circuit 20 receives at its non-inverting input terminal (+) a reference voltage Vref generated by a power source 17. The output of the operational amplifier, i.e. the output of the control circuit 20, is fed to the base of the output power transistor 12.

The overcurrent protection circuit 15 is connected between the input power source VCC1 and the control circuit 20, and the short-circuiting protection circuit 16 is connected between the emitter of the output power transistor 12 and the control circuit 20. The overcurrent protection circuit 15 and the short-circuiting protection circuit 16 are both supplied with electric power from the input power source VCC1. The overcurrent protection circuit 15 monitors the current flowing through the output power transistor 12, and operates so that the current does not exceed a predetermined level. Even if the output terminal Vo happens to be short-circuited to ground and accordingly the potential at the inverting input terminal of the operational amplifier drops, the short-circuiting protection circuit 16 prevents the output power transistor 12 from being driven at an excessively high operating level. Without these protection circuits, the output power transistor 12 may dissipate excessive electric power and break down.

Inconveniently, however, a conventional protection circuit operates only when a voltage higher than a predetermined level is supplied. Thus, in a constant voltage output circuit that is supplied with electric power from a single input power source, when the input power source is turned on from a state in which no voltage is present there, that is, when the input power source is turned on from a state in which it is completely off, a protection circuit does not operate until the supplied voltage becomes equal to or higher than a predetermined level at or above which individual circuit can operate. That is, in a case where a single input power source is used, unless a voltage equal to or higher than a predetermined level is present, a protection circuit does not operate. Even then, the circuit for driving an output transistor does not operate either; thus, the output transistor is not driven at a higher-than-rated operating level. Consequently, no problem results from the failure of the protection circuit to operate.

On the other hand, in a case where there are two or more input power sources, for example in a case where, as in the constant voltage output circuit shown in FIG. 8, there are one input power source VCC2 for supplying electric power to the control circuit 20 and driving an overcurrent protection circuit 15 and a short-circuiting protection circuit 16 and another input power source VCC1 for supplying a voltage to the collector of an output power transistor 12, if, from a state in which both input power sources are off, the input power source VCC1 is turned on first and then the input power source VCC2 is turned on, there occurs a period in which, while the overcurrent protection circuit 15 and the short-circuiting protection circuit 16 are not operating, the output power transistor 12 is driven. If the input power sources VCC2 and VCC1 start up in this order when, for example, the output terminal Vo happens to be short-circuited, the output power transistor 12 may break down.

SUMMARY OF THE INVENTION

In view of the inconveniences discussed above, it is an object of the present invention to provide a constant voltage output circuit in which a protection circuit operates irrespective of the order in which a plurality of input power sources start up and thus stably enough to prevent an output power transistor from being driven at an excessively high operating level.

To achieve the above object, according to one aspect of the present invention, a constant voltage output circuit is provided with: an output power transistor whose first electrode is supplied with electric power from a first input power source; a control circuit that is supplied with electric power from a second input power source and that feeds a control signal to the control electrode of the output power transistor to control its driving; an output terminal connected to the second electrode of the output power transistor; and a first protection circuit that operates by being supplied with electric power from the first input power source and that protects the output power transistor when the voltage supplied from the first input power source is equal to or higher than a predetermined level. Here, the constant voltage output circuit further is further provided with: a second protection circuit that makes the control circuit stop the driving of the output power transistor when the voltage supplied from the first input power source is lower than the predetermined level in order to thereby prevent a current larger than a predetermined level from flowing through the output power transistor.

According to another aspect of the present invention, the second protection circuit may be provided with: a first transistor of the NPN-type that has its collector connected to the second input power source; a second transistor of the NPN-type that has its collector and base connected to the first input power source and that has its base connected to the base of the first transistor; and a third transistor that has its base connected to the collector of the first transistor, has its emitter connected to the emitter of the second transistor, and has its collector connected to the control electrode of the output power transistor.

According to yet another aspect of the present invention, in the constant voltage output circuit described above, the second protection circuit may be provided with: a comparator that compares the potential supplied from the first input power source with a reference potential supplied from a reference power source so as to operate only when the potential supplied from the first input power source is lower than the reference potential.

According to yet another aspect of the present invention, in the constant voltage output circuit described above, the second input power source may be shared as the reference power source.

According to yet another aspect of the present invention, in the constant voltage output circuit described above, the comparator may include a transistor having a high withstand voltage.

According to yet another aspect of the present invention, in the constant voltage output circuit described above, the transistor having a high withstand voltage may be a transistor of the PNP type.

According to yet another aspect of the present invention, the constant voltage output circuit described above may be further provided with a resistor connected between the comparator and the first input power source.

According to yet another aspect of the present invention, the constant voltage output circuit described above may be further provided with a driver transistor that drives the output power transistor, and the second protection circuit may be provided with a first constant current source and a second constant current source, the second constant current source producing a current of the opposite polarity to the current produced by the first constant current source, the second protection circuit controlling the base current of the driver transistor by using the first and second constant current sources.

According to yet another aspect of the present invention, in the constant voltage output circuit described above, the current produced by the second constant current source may be larger than the current produced by the first constant current source.

DETAILED DESCRIPTION OF PREFERRED EMBODIMENTS

First Embodiment

Figure 1:
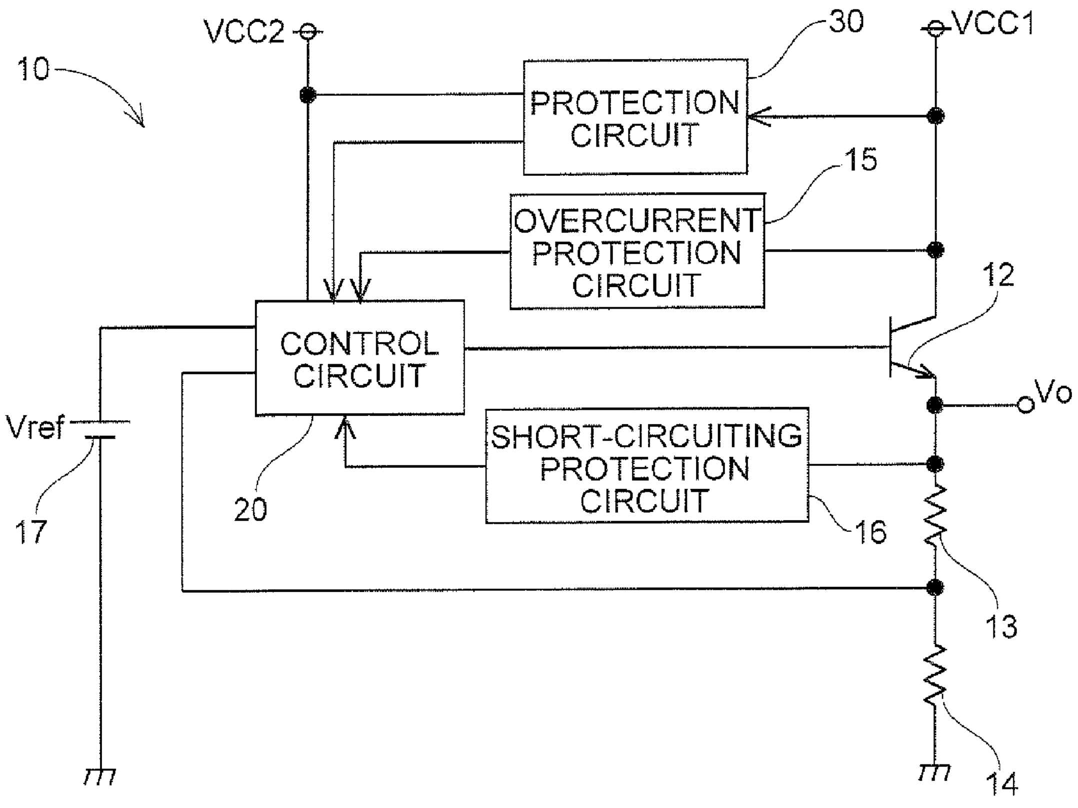
FIG. 1 is a block diagram showing the configuration of the constant voltage output circuit of a first embodiment of the present invention.
Figure 8:
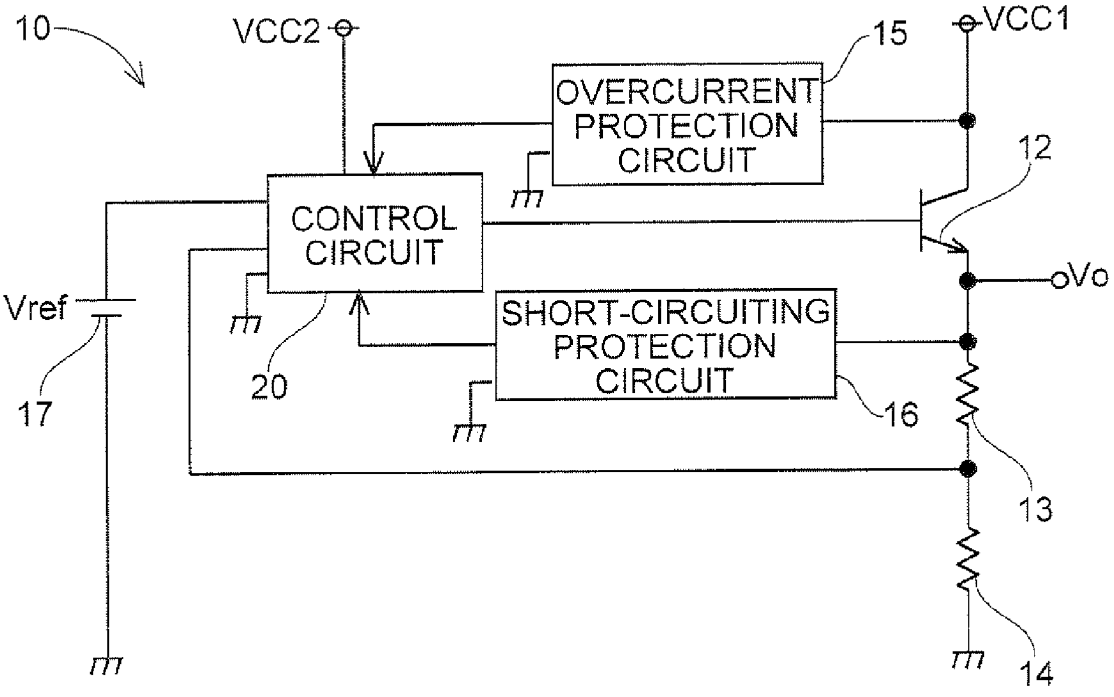
Fig. 8 PRIOR ART
FIG. 8 is a block diagram showing the configuration of a conventional constant voltage output circuit.

A first embodiment of the present invention will now be described with reference to the relevant drawings. FIG. 1 is a block circuit diagram showing the configuration of the constant voltage output circuit of the first embodiment. In the constant voltage output circuit shown in FIG. 1, those parts which serve the same purposes as their counterparts in the constant voltage output circuit shown in FIG. 8 are identified by common reference signs, and their detailed description will not be repeated.

In the first embodiment, as shown in FIG. 1, the constant voltage output circuit 10 has a protection circuit 30 connected between the input power source VCC1 and the control circuit 20. Unlike the overcurrent protection circuit 15 and the short-circuiting protection circuit 16, the protection circuit 30 is supplied with electric power from the input power source VCC2, and monitors the potential of the input power source VCC1. Whereas the overcurrent protection circuit 15 and the short-circuiting protection circuit 16 operate when the potential of the input power source VCC1 is equal to or higher than a predetermined level Va, the protection circuit 30 operates when the potential of the input power source VCC1 is lower than the level Va. The level Va is, for example, 0.8 V.

With this configuration, the base current of the output power transistor 12 is lowered and thereby the output power transistor 12 is prevented from being driven at a higher-than-rated operating level by, when the potential of the input power source VCC1 is equal to or higher than Va, the overcurrent protection circuit 15 and the short-circuiting protection circuit 16 and, when that potential is lower than Va, the protection circuit 30.

Figure 2:
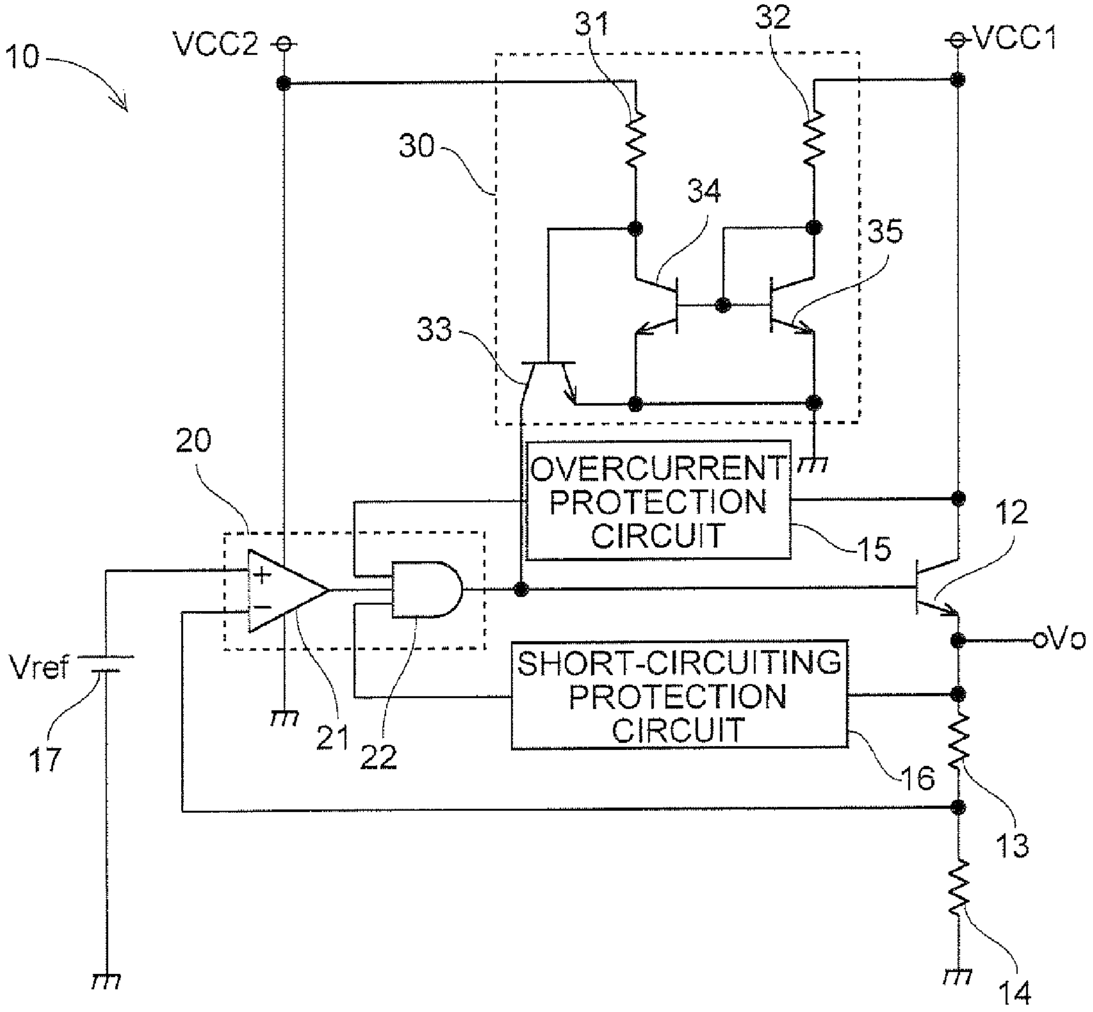
FIG. 2 is a block diagram showing an example of the configuration of the protection circuit in the first embodiment.

FIG. 2 shows an example of the configuration of the constant voltage output circuit 10 in this embodiment. In FIG. 2, the control circuit 20 is provided with: a resistor 31 of which one end is connected to the input power source VCC2; a resistor 32 of which one end is connected to the input power source VCC1; an NPN-type transistor 33 of which the base is connected to the other end of the resistor 31; an NPN-type transistor 34 of which the collector is connected to the other end of the resistor 31; and an NPN-type transistor 35 of which the collector is connected to the other end of the resistor 32. The emitters of the transistors 33, 34, and 35 are all grounded. The collector and base of the transistor 35 and the base of the transistor 34 are connected together. The control circuit 20 is provided with an operational amplifier 21 and an AND gate 22. The operational amplifier 21 has its inverting input terminal (−) connected to the node between the voltage division resistors 13 and 14, and receives at its non-inverting input terminal (+) the reference voltage Vref generated by the power source 17. The AND gate 22 receives at its input terminals the outputs of the overcurrent protection circuit 15, the short-circuiting protection circuit 16, and the operational amplifier 21. The output of the AND gate 22 and the collector of the transistor 33 are connected to the base of the output power transistor 12.

With this configuration, the current at the base of the output power transistor 12 is diverted to the collector of the transistor 33, and thereby the output power transistor 12 is turned off. In this way, the protection circuit 30 prevents the output power transistor 12 from being driven at a higher-than-rated operating level.

On the other hand, thanks to the resistors 31 and 32, when the input power source VCC1 is off and the input power source VCC2 alone is on, the resistor 31 supplies a current to the base of the transistor 33 to permit a collector current to flow through the transistor 33; thus, the output power transistor 12 remains off.

In this state, when the input power source VCC1 is turned on and a voltage equal to or higher than the level Va, which enables the transistor 35 to operate, appears at the input power source VCC1, a current flows through the transistor 35. Simultaneously, a similar current flows through the transistor 34, which along with the transistor 35 forms a current mirror. This causes the base potential of the transistor 33 to lower and thus turns the transistor 33 off disabling the protection circuit 30 from operating. In this way, when the voltage from the input power source VCC1 becomes equal to or higher than the predetermined level Va, the transistor 33 turns off and disables the protection circuit 30 from operating. Instead, now the overcurrent protection circuit 15 and the short-circuiting protection circuit 16 operate so that, in case of an overcurrent or short-circuited state, the output power transistor 12 is protected by the overcurrent protection circuit 15 and the short-circuiting protection circuit 16.

As described above, when the input power source VCC2 is turned on first and then the input power source VCC1 is turned on, the output power transistor 12 is inhibited from operating, in the beginning, by the protection circuit 30 and, thereafter, by the overcurrent protection circuit 15 and the short-circuiting protection circuit 16. On the other hand, when the input power source VCC1 is turned on first and then the input power source VCC2 is turned on, while the potential of the input power source VCC1 is lower than Va, the output power transistor 12 is not driven at a higher-than-rated operating level and, when that potential becomes equal to or higher than Va, the output power transistor 12 is then ready to be protected by the overcurrent protection circuit 15 and the short-circuiting protection circuit 16. In this way, irrespective of the order in which the input power sources VCC1 and VCC2 start up, the overcurrent protection circuit 15, the short-circuiting protection circuit 16, or the protection circuit 30 operates properly to protect the output power transistor 12.

Second Embodiment

Figure 3:
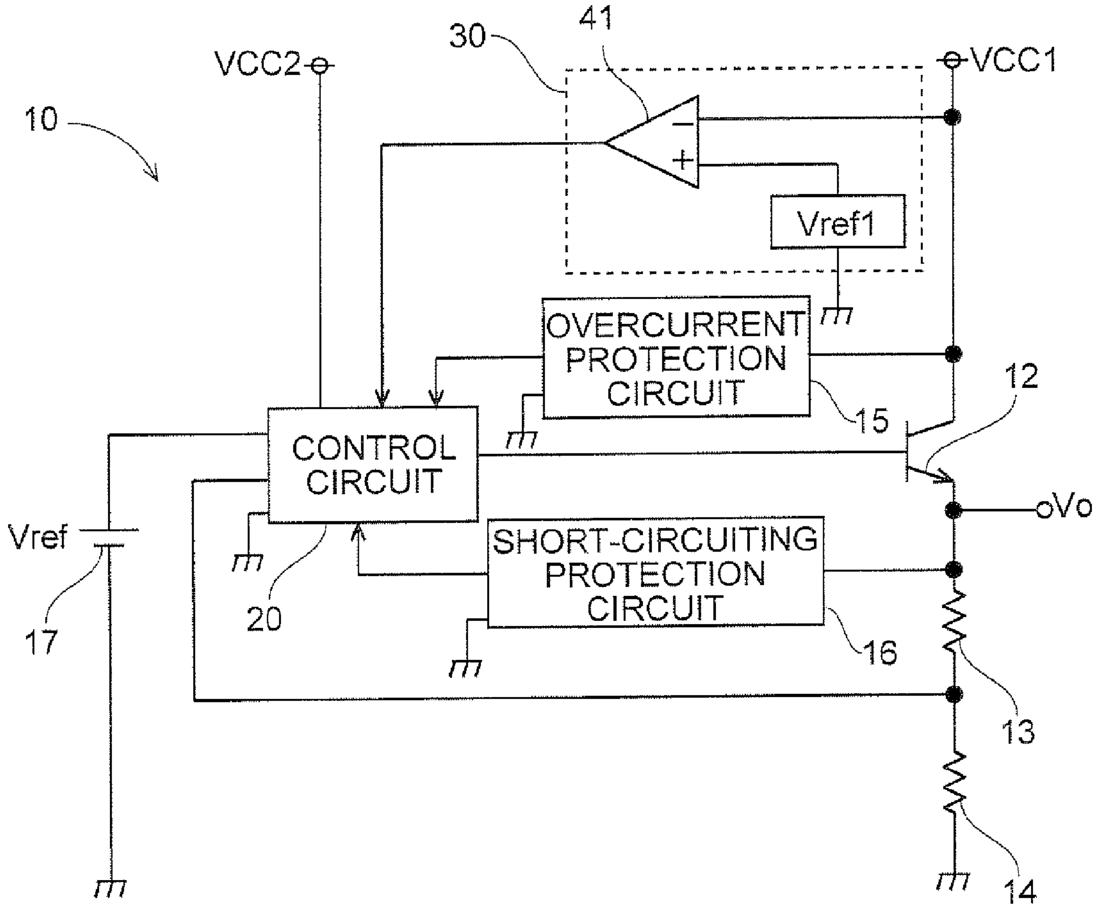
FIG. 3 is a block diagram showing the configuration of the constant voltage output circuit of a second embodiment of the present invention.

A second embodiment of the present invention will now be described with reference to the relevant drawings. FIG. 3 is a block circuit diagram showing the configuration of the constant voltage output circuit of the second embodiment. In the constant voltage output circuit shown in FIG. 3, those parts which serve the same purposes as their counterparts in the constant voltage output circuit show in FIG. 1 are identified by common reference signs, and their detailed description will not be repeated.

In the constant voltage output circuit 10 shown in FIG. 3, the protection circuit 30 is provided with a comparator 41. The comparator 41 has its inverting input terminal (−) connected to the input power source VCC1, and receives at its non-inverting input terminal (+) a reference voltage Vref1. The comparator 41 compares the voltage of the input power source VCC1 with the reference voltage and outputs the result of the comparison.

When the output of the comparator 41 is logically high, that is, when the voltage of the input power source VCC1 is lower than the reference voltage, the protection circuit 30 operates so as to prevent the output power transistor 12 from being driven at a higher-than-rated operating level. By contrast, when the output of the comparator 41 is logically low, that is, when the voltage of the input power source VCC1 is higher than the reference voltage, the protection circuit 30 does not operate.

Here, supposing that the reference voltage is equal to Va, the potential of the input power source VCC1 is equal to or higher than Va, which enables the overcurrent protection circuit 15 and the short-circuiting protection circuit 16 to operate; thus, the output power transistor 12 is now ready to be protected by the overcurrent protection circuit 15 and the short-circuiting protection circuit 16. With this configuration, the operating voltage of the protection circuit 30 can easily be set.

In this embodiment, the input power source VCC2 may be shared as the power source that supplies the reference voltage Vref1. Since the input power source VCC2 generates the reference voltage for the constant voltage output circuit 10 and operates stably, it can provide an accurate operating voltage for the protection circuit 3.

Figure 4:
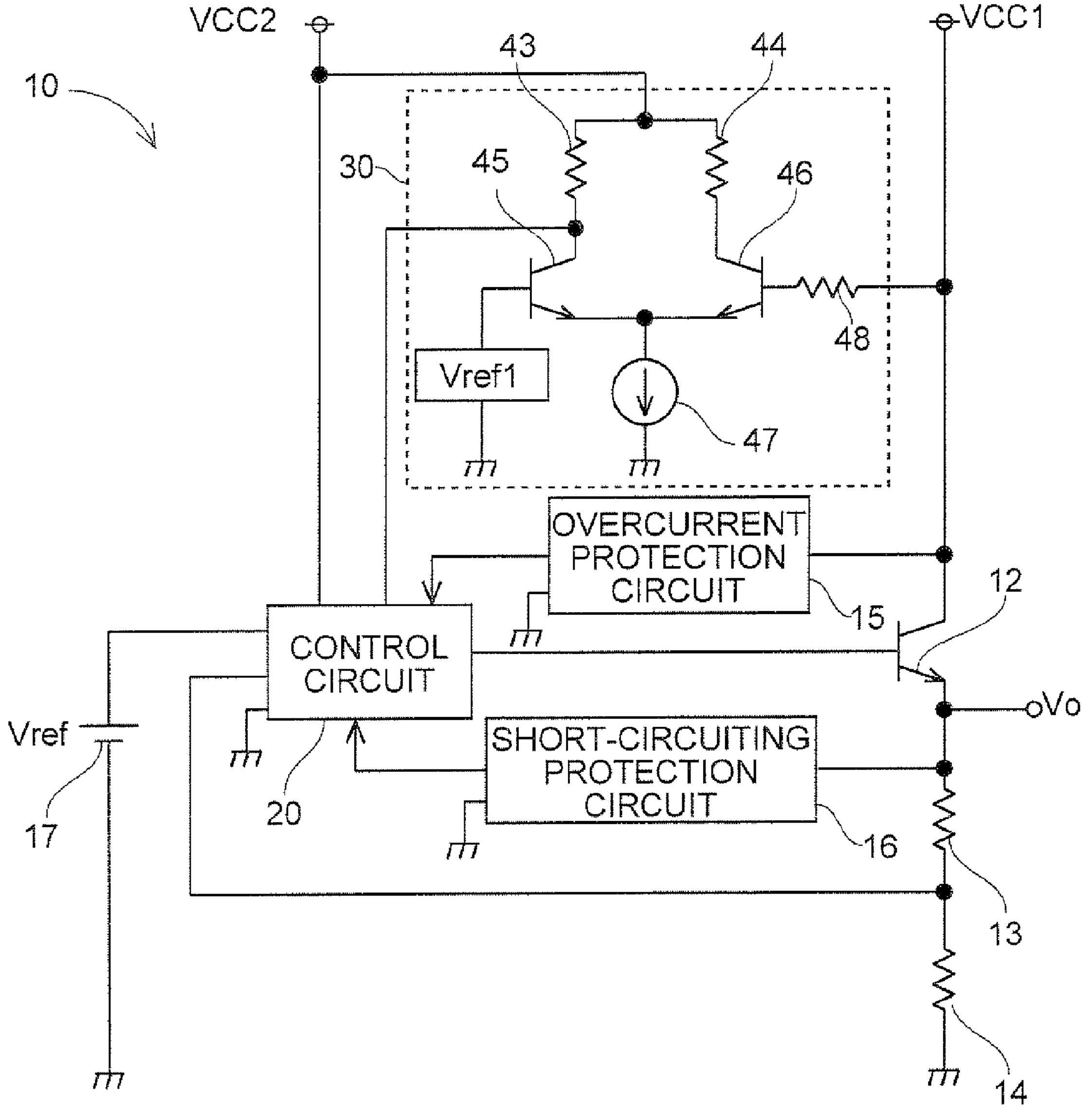
FIG. 4 is a block diagram showing an example of the configuration of the protection circuit in the second embodiment.

FIG. 4 shows an example of the configuration of the protection circuit 30. The protection circuit 30 is provided with: resistors 43 and 44 of which one end of each is connected to the input power source VCC2; an NPN-type transistor 45 of which the collector is connected to the other end of the resistor 43; an NPN-type transistor 46 of which the collector is connected to the other end of the resistor 44; a constant current source 47 of which one end is connected to the emitters of the transistors 45 and 46; and a resistor 48 of which one end is connected to the base of the transistor 46 and of which the other end is connected to the input power source VCC1. The collector of the transistor 45 is connected to the control circuit 20.

When the voltage from the input power source VCC1 is sufficiently high, the emitter-base voltage of the transistor 46 is so high that $V_{EBO}$ (the open-collector emitter-base withstand voltage) of the transistor 46 may be important. Since a PNP-type transistor generally has a higher withstand voltage than an NPN-type one, using a PNP-type one as the transistor 46 here helps set the voltage of the input power source VCC1 higher. Instead, any other device having a modified transistor structure may be use.

If a high voltage such as a surge is applied to the input power source VCC1, an excessively high voltage may be applied to the base of the transistor 46, possibly destroying or degrading the transistor 46. Thanks to the voltage drop across the resistor 48, however, this can be prevented, so that the constant voltage output circuit 10 operates more stably.

Figure 5:
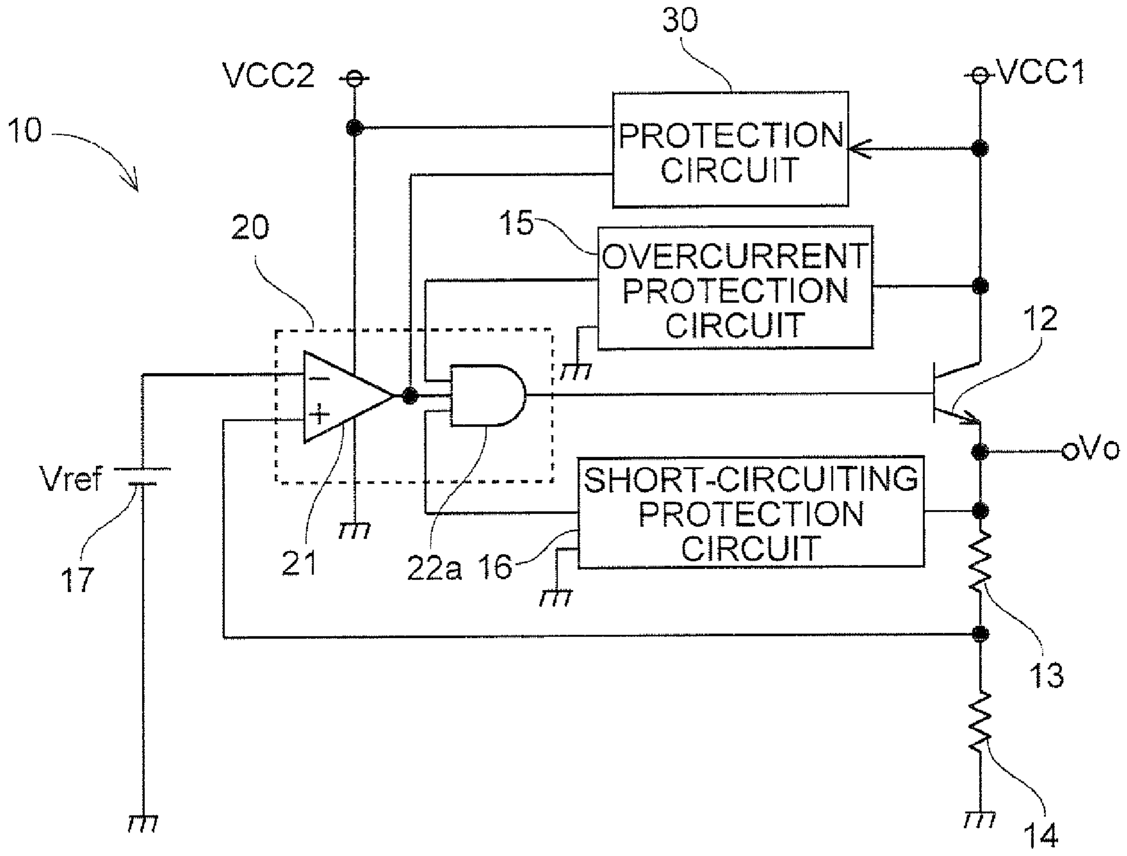
FIG. 5 is a block diagram showing a modified example of the constant voltage output circuit of the second embodiment.

In this embodiment, the control circuit 20 may be, for example as shown in a block diagram in FIG. 5, one provided with an operational amplifier 21 and an AND gate 22*a*. The operational amplifier 21 has its inverting input terminal (−) connected to the node between the voltage division resistors 13 and 14, and receives at its non-inverting input terminal (+) the reference voltage Vref generated by the power source 17. The AND gate 22*a* receives at its input terminals the outputs of the overcurrent protection circuit 15, the short-circuiting protection circuit 16, and the operational amplifier 21. The output of the AND gate 22*a* is fed to the base of the output power transistor 12.

With this configuration, when the outputs of the operational amplifier 21, the overcurrent protection circuit 15, the short-circuiting protection circuit 16, and the protection circuit 30 are all logically high, the output power transistor 12 is supplied with its base current; when any of the outputs of the operational amplifier 21, the overcurrent protection circuit 15, the short-circuiting protection circuit 16, and the protection circuit 30 is logically low, the output power transistor 12 ceases to be supplied with its base current.

Third Embodiment

Figure 6:
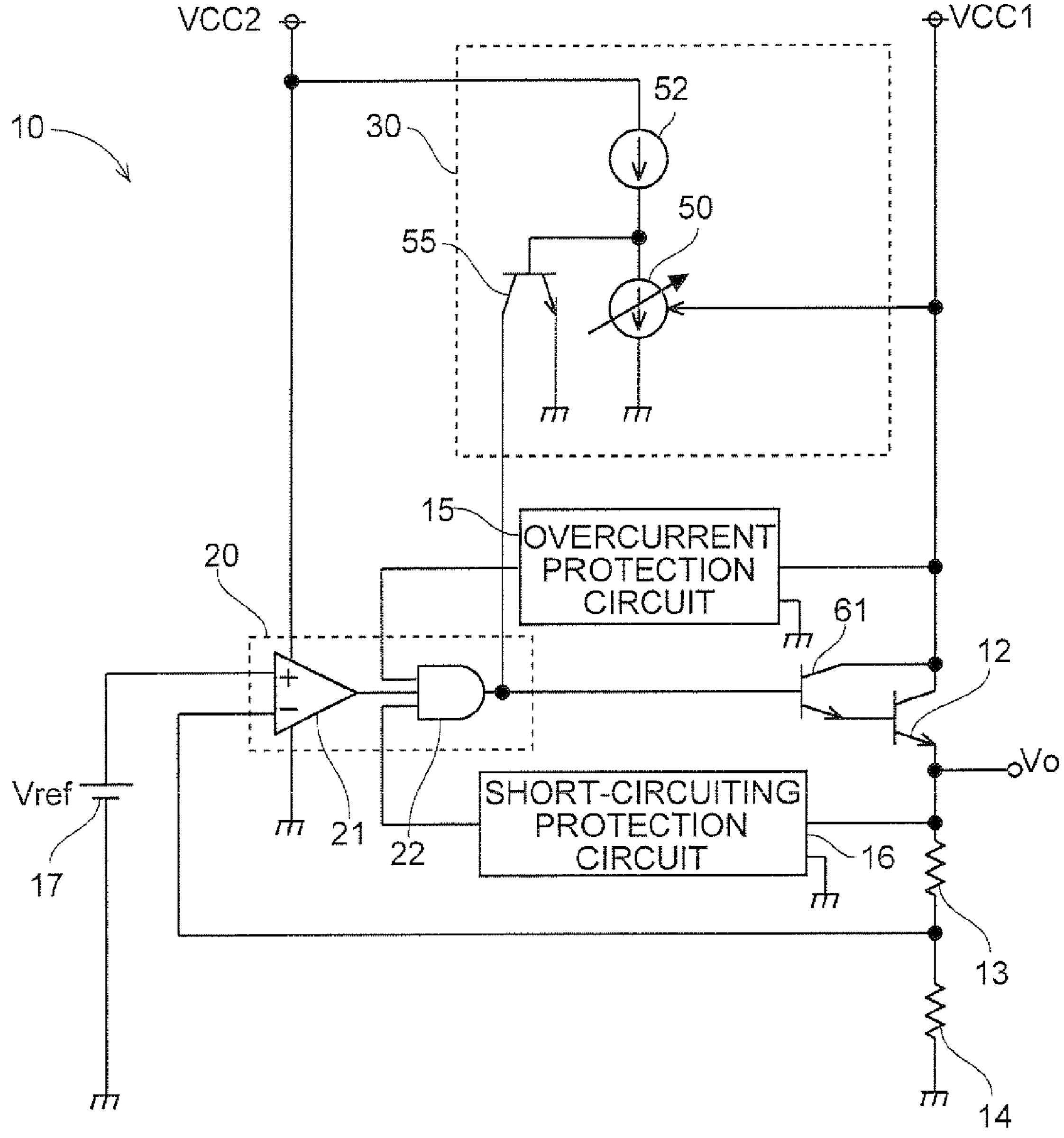
FIG. 6 is a block diagram showing the configuration of the constant voltage output circuit of a third embodiment of the present invention.

A third embodiment of the present invention will now be described with reference to the relevant drawings. FIG. 6 is a block circuit diagram showing the configuration of the constant voltage output circuit of the third embodiment. In the constant voltage output circuit shown in FIG. 6, those parts which serve the same purposes as their counterparts in the constant voltage output circuit shown in FIG. 1 are identified by common reference signs, and their detailed description will not be repeated.

In the constant voltage output circuit 10 shown in FIG. 6, the protection circuit 30 is provided with: a constant current source 50 of which one end is grounded; a constant current source 52 of which one end is connected to the other end of the constant current source 50 and of which the other end is connected to the input power source VCC2; and an NPN-type transistor 55 of which the base is connected to the node between the constant current sources 50 and 52 and of which the emitter is grounded. The transistor 55 has its emitter grounded, and has its collector connected to the output of the AND gate 22 provided in the control circuit 20. In addition, the constant voltage output circuit 10 is additionally provided with a driver transistor 61 for driving the output power transistor 12, and the control circuit 20 is composed of an operational amplifier 21 and an AND gate 22. The driver transistor 61 has its emitter connected to the base of the output power transistor 12, has its collector connected to the input power source VCC1, and has its base connected to the output of the AND gate 22 and to the collector of the transistor 55. The constant current source 50 operates according to the voltage of the input power source VCC1; specifically, the constant current source 50 produces a current when the voltage of the input power source VCC1 is equal to or higher than the predetermined level Va.

The protection circuit 30 inhibits the output power transistor 12 from operating by diverting the base current of the driver transistor 61, which supplies the output power transistor 12 with its base current, to the collector output of the transistor 55. Here, the transistor 55, which is the output transistor of the protection circuit 30, is controlled by the constant current sources 50 and 52.

When the potential of the input power source VCC1 is lower than Va, as when the input power source VCC2 alone is on, the constant current source 50 produces no current. Thus, the transistor 55 produces its collector output, and the base current of the driver transistor 61 is diverted to it, causing the driver transistor 61 to stop operating. The output power transistor 12 now ceases to be supplied with its base current, and is thus inhibited from operating. By contrast, when the potential of the input power source VCC1 is equal to or higher than Va, the constant current source 50 produces a current larger than that produced by the constant current source 52, and thereby diverts the base current of the transistor 55 so that the transistor 55 cannot produce its collector output; thus, the protection circuit 30 does not operate. This control is done by the constant current sources 50 and 52, and thus can be done easily, without being greatly affected by variations in the characteristics of the transistor 55.

Figure 7:
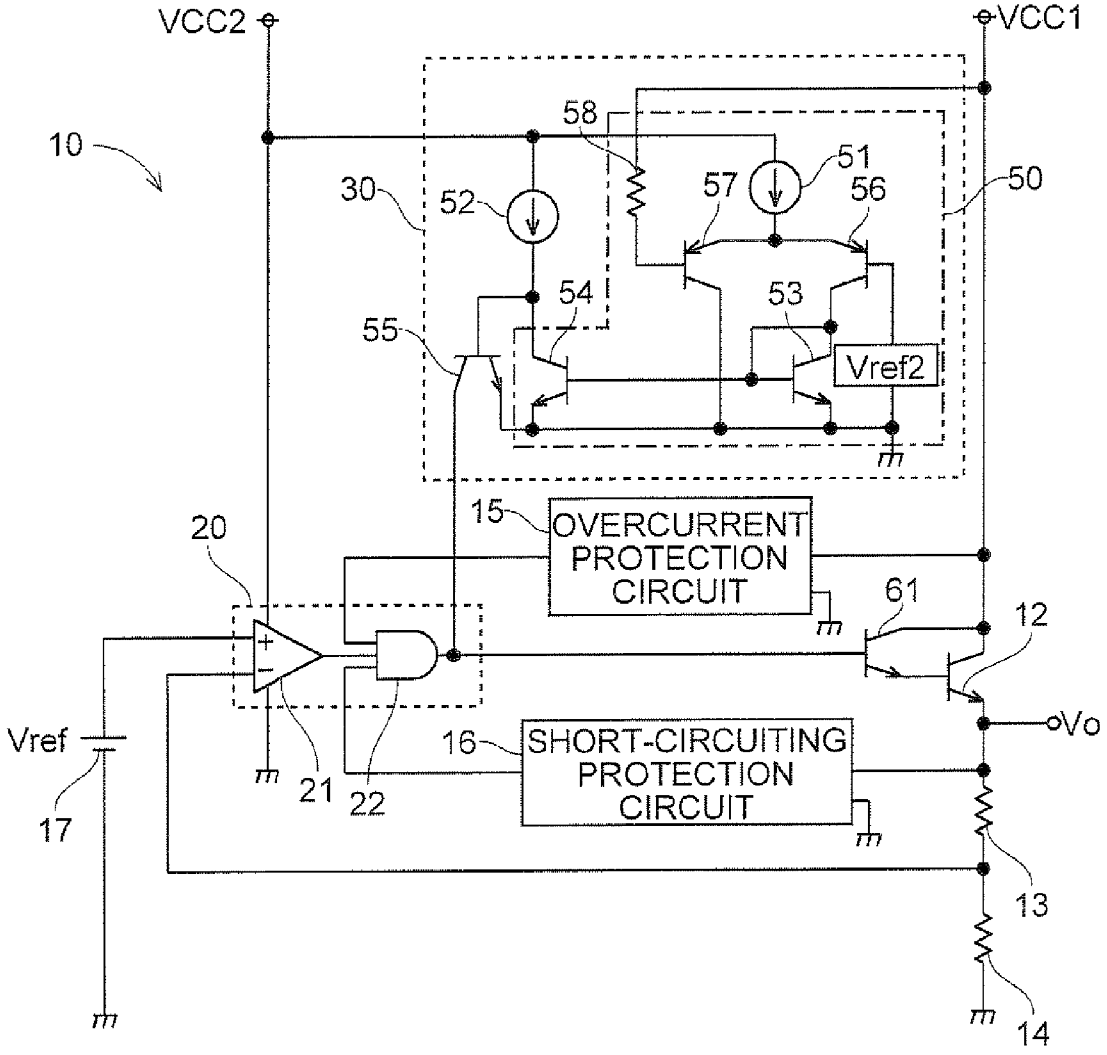
FIG. 7 is a block diagram showing an example of the configuration of the protection circuit in the third embodiment.

FIG. 7 shows an example of the configuration of the protection circuit 30 in this embodiment. In the protection circuit 30, the constant current source 50 is provided with: a constant current source 51 of which one end is connected to the input power source VCC2; PNP-type emitter-coupled differential pair transistors 56 and 57 of which the emitters are connected to the other end of the constant current source 51; an NPN-type transistor 53 of which the collector is connected to the collector of the transistor 56; and an NPN-type transistor 54 of which the collector is connected to the base of the transistor 55. The transistors 53 and 54 have their bases connected together, and both have their emitters grounded. The collector and base of the transistor 53 are connected together. A reference voltage Vref2 is connected to the base of the transistor 56, and the input power source VCC1 is connected via a resistor 58 to the base of the transistor 57.

In the constant current source 50, the current through the transistor 57 is null when the voltage of the input power source VCC1 is equal to or lower than a predetermined level, and increases as that voltage rises. On the other hand, the current through the transistor 56 is supplied, along with the current through the transistor 57, from the constant current source 51, and decreases as the voltage of the input power source VCC1 rises, the current through the transistor 53 also decreasing simultaneously. Thus, the transistors 53 and 54 form a current mirror circuit, and equal currents flow through the transistors 53 and 54. That is, in the constant current source 50, the current through the transistor 54 is, along with the current through the transistor 53, controlled by the voltage of the input power source VCC1. Here, with a configuration such that, when the voltage of the input power source VCC1 becomes equal to or higher than the predetermined level Va, the current through the transistor 54 becomes larger than that produced by the constant current source 52, the base current of the transistor 55 can be diverted so that the transistor 55 ceases to produce its collector current and thereby makes the protection circuit 30 to stop operating.

Here, the transistors 53 and 54 form a current mirror circuit, and, if there are variations in characteristics between them, it may be possible that the base current of the transistor 55 cannot be reduced completely to zero. This, however, can be avoided by making the proportion of that portion of the current flowing at the base of the transistor 55 which originates from the constant current source 51 higher than the portion of the same current which originates from the constant current source 52, because then the base current of the transistor 55 can successfully be diverted.

In the first to third embodiments, there may be provided more than one input power source like the input power source VCC2 from which to supply electric power to the output terminal Vo. Even in that case, the output power transistor can be protected by the overcurrent protection circuit 15, the short-circuiting protection circuit 16, and the protection circuit 30 irrespective of the order in which the input power sources start up.

What is claimed is:

1. A constant voltage output circuit comprising:

an output power transistor having a first electrode supplied with electric power from a first input power source;

a control circuit supplied with electric power from a second input power source and feeding a control signal to a control electrode of the output power transistor to control driving thereof;

an output terminal connected to a second electrode of the output power transistor; and a first protection circuit operating by being supplied with electric power from the first input power source and protecting the output power transistor when a voltage supplied from the first input power source is equal to or higher than a predetermined level, wherein the constant voltage output circuit further comprises:

a second protection circuit making the control circuit stop the driving of the output power transistor when the voltage supplied from the first input power source is lower than the predetermined level in order to thereby prevent a current larger than a predetermined level from flowing through the output power transistor.

2. The constant voltage output circuit according to claim 1, wherein the second protection circuit comprises:

a first transistor of an NPN-type having a collector thereof connected to the second input power source;

a second transistor of an NPN-type having a collector and a base thereof connected to the first input power source and having the base thereof connected to a base of the first transistor; and a third transistor having a base thereof connected to the collector of the first transistor and having an emitter thereof connected to an emitter of the second transistor, the third transistor having a collector thereof connected to the control electrode of the output power transistor.

3. The constant voltage output circuit according to claim 1, wherein the second protection circuit comprises:

a comparator comparing a potential supplied from the first input power source with a reference potential supplied from a reference power source, the comparator operating only when the potential supplied from the first input power source is lower than the reference potential.

4. The constant voltage output circuit according to claim 3, wherein the second input power source is shared as the reference power source.

5. The constant voltage output circuit according to claim 3, wherein the comparator includes a transistor having a high withstand voltage.

6. The constant voltage output circuit according to claim 5, wherein the transistor having a high withstand voltage is a transistor of a PNP type.

7. The constant voltage output circuit according to claim 3, further comprising:

a resistor connected between the comparator and the first input power source.

8. The constant voltage output circuit according to claim 1, further comprising:

a driver transistor driving the output power transistor, wherein the second protection circuit comprises a first constant current source and a second constant current source, the second constant current source producing a current of an opposite polarity to a current produced by the first constant current source, the second protection circuit controlling a base current of the driver transistor by using the first and second constant current sources.

9. The constant voltage output circuit according to claim 8, wherein the current produced by the second constant current source is larger than the current produced by the first constant current source.

* * * * *